United States Patent [19]

Tanei et al.

[11] 4,308,571
[45] Dec. 29, 1981

[54] LOW TEMPERATURE-SINTERABLE DIELECTRIC COMPOSITION AND THICK FILM CAPACITOR USING THE SAME

[75] Inventors: Hirayoshi Tanei; Akira Ikegami; Noriyuki Taguchi, all of Yokohama; Katsuo Abe, Yokosuka; Hiroshi Ohtsu, Mito; Tokio Isogai, Fujisawa, all of Japan

[73] Assignee: Hitachi, Ltd., Tokyo, Japan

[21] Appl. No.: 134,281

[22] Filed: Mar. 26, 1980

[30] Foreign Application Priority Data

Mar. 28, 1979 [JP] Japan .................................. 54/35460

[51] Int. Cl.$^3$ .............................................. H01G 4/12
[52] U.S. Cl. ..................................... 361/321; 501/10; 501/136
[58] Field of Search ........................ 361/320, 321, 322; 106/73.3, 39.8; 252/520, 521, 63.5

[56] References Cited

U.S. PATENT DOCUMENTS

| | | | |
|---|---|---|---|
| 3,472,776 | 10/1969 | Derbyshire | 252/63.5 X |
| 3,864,159 | 2/1975 | Field et al. | 252/63.5 X |
| 3,995,300 | 11/1976 | Masumura et al. | 106/73.3 X |
| 4,048,546 | 9/1977 | Bouchard et al. | 361/321 |
| 4,078,938 | 3/1978 | Yonezawa et al. | 252/63.5 X |

OTHER PUBLICATIONS

Bokov et al., "Ferroelectric Antiferromagnetics", Soviet Phys. JETP., vol. 15, pp. 447–449 (1962).
Krainik et al., "Antiferroelectric and Ferroelectric Properties of Certain Solid Solutions Containing $Pb_2MgWO_6$", Soviet Physics–Solid State, vol. 2, pp. 63–65, 1960.
Agranovskaya, A. I., "Physical–Chemical Investigation of the Formation of Complex Ferroelectrics with the Perovskite Structure", Akad. Nauk., Phys. Series, pp. 1271–1277 (1960).

Primary Examiner—Elliot A. Goldberg
Attorney, Agent, or Firm—Craig and Antonelli

[57] ABSTRACT

A low temperature-sinterable dielectric composition is provided, whose sintered composition when prepared by firing a uniform mixture consisting of lead ferrotungstate, lead titanate and manganese dioxide at a temperature of not higher than 1,000° C. has the general formula $A \cdot Pb(Fe_{2/3}W_{1/3})_{1-x}Ti_xO_3 + B \cdot MnO_2$, wherein $0.005 \leq X \leq 0.65$, $A = 0.95$–$0.9995$, and $B = 0.0005$–$0.05$, a relative dielectric constant of at least 2,000 at 25° C., a dissipation factor (tan δ) of not more than 5% at 25° C., and a specific resistance of at least $10^9 \Omega \cdot cm$ at 25° C. Also provided is a thick film capacitor having a dielectric layer prepared from said composition.

5 Claims, 2 Drawing Figures

LOW TEMPERATURE-SINTERABLE DIELECTRIC COMPOSITION AND THICK FILM CAPACITOR USING THE SAME

BACKGROUND OF THE INVENTION

1. FIELD OF THE INVENTION

The present invention relates to a low temperature-sinterable dielectric composition, whose sintered composition, when prepared by firing a uniform mixture consisting of lead ferrotungstate, lead titanate and manganese dioxide at a temperature of not higher than 1,000° C. has the general formula $A.Pb(Fe_{\frac{2}{3}}W_{\frac{1}{3}})_{1-x}Ti_xO_3 + B.MnO_2$, wherein $0.005 \leq x \leq 0.65$, $A = 0.95 - 0.9995$ and $B = 0.0005 - 0.05$, a relative dielectric constant of at least 2,000 at 25° C., a dissipation factor (tan δ) of not more than 5% at 25° C., and a specific resistance of at least $10^9$ Ω.cm at 25° C., and also to a thick film capacitor having a dielectric layer prepared from said composition.

2. DESCRIPTION OF THE PRIOR ART

Barium titanate so far used as a dielectric substance has a sintering temperature as high as 1,300°–1,400° C., and has the relative dielectric constant of 1,500 at the room temperature and the relative dielectric constant of 6,000 at the curie point (120° C.).

To improve the relative dielectric constant of barium titanate at the room temperature, the following methods (1) and (2) have been used.

(1) Method for reducing grain sizes of barium titanate ceramics to about 1 μm, and (2) method for lowering the curie point of barium titanate to the room temperature by adding strontium titanate, calcium stannate, barium stannate, barium zirconate, etc. to barium titanate.

However, the dielectric substances obtained according to said methods (1) and (2) have a relative dielectric constant of 2,000–6,000 at 25° C., but still have a high sintering temperature such as 1,300°–1,400° C. Thus, in the production of thick film capacitors (including laminated capacitors), it is necessary to use an expensive metal containing platinum or palladium capable of withstanding the sintering temperature as a main component as electrode.

Thus, a dielectric composition capable of being sintered at a low temperature such as not higher than 1,000° C. will be very preferable owing to the following advantages in the production of thick film capacitors:

(1) A cheaper firing oven than the conventional one will be applicable.

(2) Thermal energy can be saved.

(3) Cheaper metal of silver group can be used as electrode.

As the dielectric composition capable of being sintered at a low temperature such as not higher than 1,000° C., lead-containing complex perovskite type oxide, etc. have been reported (A. I. Agronooskaya: Akad. Nauk. Phys. Serie, 1960, pp 1271–1277). Furthermore, it has been reported that, among said oxides, $Pb(Fe_{\frac{2}{3}}W_{\frac{1}{3}})O_3$ (lead ferrotungstate) can be sintered at 880° C., and the resulting sintered product has the relative dielectric constant of 1,800 at 25° C. and the dielectric constant of 8,700 at the curie point (−95° C.) (A. Bokov et al: Soviet Phys. JETP, 1962, Vol. 15, pp 447–449). However, said sintered product has a high dissipation factor at 25° C., such as 16%, and a low specific resistance at 25° C. such as $10^7$ Ω.cm, and thus cannot be applied as a dielectric substance.

SUMMARY OF THE INVENTION

An object of the present invention is to provide a low temperature-sinterable dielectric composition, whose sintered composition, when prepared by firing at a temperature of not higher than 1,000° C., has a relative dielectric constant of at least 2,000 at 25° C., a dissipation factor of not higher than 5% at 25° C., and a specific resistance of at least $10^9$ Ω.cm at 25° C., and also to provide a thick film capacitor having a dielectric layer prepared from said composition.

The object can be attained by increasing the relative dielectric constant at 25° C. to at least 2,000, the dissipation factor at 25° C. to not higher than 5%, and the specific resistance at 25° C. to at least $10^9$ Ω.cm as applicable as a dielectric substance for capacitors without losing the sinterability of lead ferrotungstate as a basic component at a low temperature of not higher than 1,000° C.

In order to enhance the relative dielectric constant of lead ferrotungstate at 25° C., it is necessary to shift the curie point from −95° C. to a higher temperature. To this end, it has been regarded as effective to add thereto lead titanate and barium titanate having a high curie point, but it has been found that the addition of barium titanate cannot improve the dissipation factor and specific resistance at 25° C., whereas the addition of lead titanate having the relative dielectric constant of 7,000 at the curie point (490° C.) can hardly produce a sintered dense substance owing to the high melting point of 1,285° C., but can undergo solid solution, when sintered together with lead ferrotungstate, and thus can be sintered at a low temperature such as not higher than 1,000° C. with a relative dielectric constant of at least 2,000 at 25° C.

On the other hand, nickel oxide, zinc oxide, manganese dioxide, bismuth oxide, etc. are generally known as an additive for improving the dissipation factor and specific resistance at 25° C. of dielectric compositions. However, it has not been known whether these additives are effective for a dielectric composition consisting of lead ferrotungstate and lead titanate or not The present inventors have found that, among the additives, manganese dioxide is effective for the dielectric composition, and the object of the present invention can be attained by a dielectric composition consisting of lead ferrotungstate, lead titanate and manganese dioxide.

The present low temperature-sinterable, dielectric composition consisting of lead ferrotungstate, lead titanate and manganese dioxide can be represented by the following general formula:

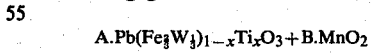

$$A.Pb(Fe_{\frac{2}{3}}W_{\frac{1}{3}})_{1-x}Ti_xO_3 + B.MnO_2$$

The dielectric composition, in which (1) $0.005 \leq x \leq 0.65$, $A = 0.95 - 0.9995$ and $B = 0.0005 - 0.05$ in said general formula, has a relative dielectric constant of at least 2000 at 25° C., a dissipation factor of not higher than 5% at 25° C., and a specific resistance of at least $10^9$ Ω.cm at 25° C., when fired at a temperature of not higher than 1,000° C.; the dielectric composition, in which (2) $0.005 \leq x \leq 0.40$, $A = 0.95 - 0.9995$, and $B = 0.0005 - 0.05$ in said general formula, can attain the object even when fired at a temperature of not higher than 900° C. (for example, for two hours at 900° C.); the dielectric composition in which (3) $0.005 \leq X \leq 0.35$, $A=0.95-0.9995$ and $B=0.0005-0.05$ in said general formula, can attain the object, when fired at 900° C. for 10 minutes; the dielectric composition in which (4) $0.05 \leq = \leq 0.30$, $A=0.95-0.9995$, and $B=0.0005-0.05$, can have a relative dielectric constant of 3,400-9,500 at 25° C. and attain the object, even when fired at 900° C. for 10 minutes.

However, dielectric compositions in which x is less than 0.005 or more than 0.65 in said general formula has a relative dielectric constant of less than 2,000 at 25° C. when fired at 1,000° C., and when B is less than 0.0005, no improvement can be attained in the dissipation factor and specific resistance. When B is more than 0.05, decrease in the relative dielectric constant is considerable. Thus, these dielectric compositions are outside the scope of the present invention.

A process for producing the present low temperature-sinterable dielectric composition will be described below;

(a) Oxides of lead, iron, tungsten, titanium and manganese, or precursors for these compounds (for example, carbonates, hydroxides, chlorides, nitrates, etc.) are uniformly pulverized and mixed according to the ordinary mixing procedure (for example, by a mortar with a pestle, a ball mill, etc.).

(b) The resulting uniform mixture is calcined in air at a temperature of 650°-900° C. The calcination at a higher temperature than 900° C. leads to evaporation of lead oxide and also to excessive sintering, making successive pulverizing difficult, and thus is not preferable, whereas the calcination at a temperature lower than 650° C. makes itself incomplete.

Calcination time depends upon starting materials, their mixing proportion and calcination temperature. The ordinary calcination time is 0.5 to 8 hours.

(c)

The resulting calcined product is then pulverized in a grinder, a ball mill, etc. to obtain powder having the desired particle size. The ordinary particle size is 20 μm maximum.

(d)

The powder of calcined product is shaped into disks, for example, according to the ordinary pressing technique, and sintered. In the production of thick film capacitors, the powder is made into a dielectric paste, and the paste is applied to a lower electrode provided on a substrate plate, and baked. Then, an upper electrode is provided on the baked paste.

DESCRIPTION OF THE PREFERRED EMBODIMENTS

Figure 1:
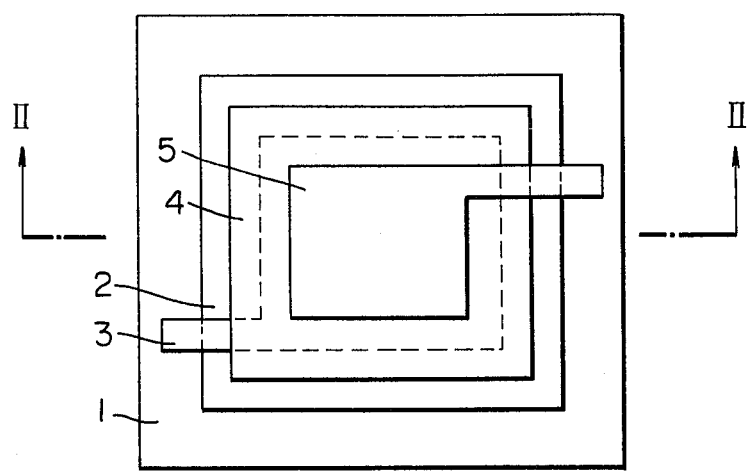
FIG. 1 is a plan view of a thick film capacitor and FIG. 2 is a cross-sectional view along line A—A of FIG. 1.

The present invention will be described below in detail, referring to examples.

EXAMPLE 1

Lead oxide (PbO), ferric oxide ($Fe_2O_3$), tungsten oxide ($WO_3$), titanium oxide ($TiO_2$) and manganese dioxide ($MnO_2$) were weighed out in the proportions shown in Table 1, NOS. 1-37, where lead ferrotungstate and lead titanate can be used in place of the said materials. 50 g of the individual weighed-out mixture was placed into a ball mill of quartz pot with pebbles together with 30 ml of distilled water, and pulverized to obtain a uniform mixture. The resulting uniform mixture was dried to remove water therefrom, and the dried mixture was placed in a platinum crucible and calcined at a temperature of 650° to 850° C. for 1 to 2 hours. Then, the calcined mixture was pulverized in a ball mill of quartz pot with pebbles for 16 hours, 20 g of the powder was admixed with 1 ml of an aqueous 3% polyvinylalcohol solution as a binder, and shaped into a disk, 15 mm in diameter and 1 mm thick, under the pressure of 0.8 tons/cm². The disk was sintered at a temperature of 900° to 1,000° C. for 10 minutes to 2 hours.

The resulting sintered disk was coated with an electroconductive silver paste to form electrodes to obtain a sample for measuring electric characteristics.

Capacity and dissipation factor (tan δ) were measured by a capacitance bridge at 25° C. and 1 kHz, and relative dielectric constant (ε) was calculated according to the following equation.

$$\epsilon = \frac{C \times d}{0.0885 \times S}$$

wherein C: capacity (pF), S: electrode area (cm²), and d: thickness of dielectric substance (cm).

Insulation resistance was measured by a high resistance meter, and specific resistance ($\rho$ Ω.cm) was calculated according to the following equation:

$$\rho = (R \times S)/d$$

wherein R: insulation resistance (Ω), S: electrode area (cm²), and d: thickness of dielectric substance (cm). The measurement of insulation resistance was carried out 30 seconds after applying DC potential of 50 V to the dielectric substance for 15 seconds.

TABLE 1

| No. | Composition $Pb(Fe_{2/3}^aW_{1/3}^b)_{1-x}Ti_xO_3$ | $MnO_2$ content (Mol. %) | Starting materials (wt. %) | | | | |
|---|---|---|---|---|---|---|---|
| | | | PbO | $Fe_2O_3$ | $WO_3$ | $TiO_2$ | $MnO_2$ |
| 1* | x = 0 | 0 | 63.10 | 15.05 | 21.85 | 0 | 0 |
| 2* | x = 0.005 | 0 | 63.15 | 14.98 | 21.75 | 0.12 | 0 |
| 3 | " | 3.0 | 62.67 | 14.87 | 21.59 | 0.11 | 0.76 |
| 4 | " | " | " | " | " | " | " |
| 5* | x = 0.01 | 0 | 63.19 | 14.92 | 21.66 | 0.23 | 0 |
| 6 | " | 3.0 | 62.71 | 14.81 | 21.50 | 0.22 | 0.76 |
| 7 | " | " | " | " | " | " | " |
| 8* | x = 0.05 | 0 | 63.55 | 14.40 | 20.91 | 1.14 | 0 |
| 9 | " | 1.5 | 63.32 | 14.34 | 20.83 | 1.13 | 0.38 |
| 10 | " | " | " | " | " | " | " |
| 11* | x = 0.10 | 0 | 64.02 | 13.74 | 19.95 | 2.29 | 0 |
| 12 | " | 0.6 | 63.92 | 13.72 | 19.92 | 2.29 | 0.15 |
| 13 | " | " | " | " | " | " | " |

TABLE 1-continued

| No. | | | | | | | |
|---|---|---|---|---|---|---|---|
| 14* | x = 0.20 | 0 | 64.96 | 12.39 | 18.00 | 4.65 | 0 |
| 15 | " | 0.3 | 64.91 | 12.38 | 17.98 | 4.65 | 0.08 |
| 16 | " | " | " | " | " | " | " |
| 17* | x = 0.25 | 0 | 65.44 | 11.71 | 16.99 | 5.86 | 0 |
| 18* | " | 0.02 | 65.44 | 11.71 | 16.99 | 5.86 | 0.005 |
| 19 | " | 0.05 | 65.43 | 11.70 | 16.99 | 5.86 | 0.01 |
| 20 | " | 0.2 | 65.41 | 11.70 | 16.99 | 5.85 | 0.05 |
| 21 | " | " | " | " | " | " | " |
| 22 | " | 1.0 | 65.36 | 11.69 | 16.97 | 5.85 | 0.13 |
| 23 | " | 3.0 | 64.93 | 11.61 | 16.86 | 5.81 | 0.78 |
| 24 | " | 5.0 | 64.58 | 11.55 | 16.77 | 5.78 | 1.32 |
| 25* | " | 6.0 | 64.39 | 11.52 | 16.72 | 5.76 | 1.60 |
| 26* | X = 0.30 | 0 | 65.93 | 11.01 | 15.98 | 7.08 | 0 |
| 27 | " | 0.2 | 65.90 | 11.00 | 15.97 | 7.08 | 0.05 |
| 28 | " | " | " | " | " | " | " |
| 29* | x = 0.35 | 0 | 66.43 | 10.30 | 14.95 | 8.32 | 0 |
| 30 | x = 0.35 | 0.1 | 66.41 | 10.30 | 14.95 | 8.32 | 0.03 |
| 31 | " | " | " | " | " | " | " |
| 32 | x = 0.40 | 0.1 | 66.91 | 9.58 | 13.90 | 9.58 | 0.03 |
| 33 | " | " | " | " | " | " | " |
| 34 | x = 0.50 | 0.1 | 67.95 | 8.10 | 11.76 | 12.16 | 0.03 |
| 35 | " | " | " | " | " | " | " |
| 36 | x = 0.65 | 0.08 | 69.56 | 5.81 | 8.43 | 16.19 | 0.02 |
| 37* | x = 0.70 | 0.08 | 70.11 | 5.02 | 7.28 | 17.57 | 0.02 |

| | Firing conditions | | Relative dielectric constant at 25° C. | Dissipation factor at 25° C. (tan δ) | Specific resistance at 25° C. |
|---|---|---|---|---|---|
| No. | Temp. (°C.) | Time (min) | ($\epsilon$) | (%) | ($\Omega \cdot$ cm) |
| 1* | 900 | 120 | 1900 | 16 | $1.0 \times 10^7$ |
| 2* | " | " | 2300 | 14 | $2.0 \times 10^7$ |
| 3 | " | 10 | 2100 | 4.4 | $8.4 \times 10^9$ |
| 4 | " | 120 | 2100 | 4.5 | $8.2 \times 10^9$ |
| 5* | " | " | 2800 | 13 | $3.0 \times 10^7$ |
| 6 | " | 10 | 2200 | 3.9 | $1.4 \times 10^{10}$ |
| 7 | " | 120 | 2300 | 4.1 | $1.2 \times 10^{10}$ |
| 8* | " | " | 6200 | 11 | $3.1 \times 10^7$ |
| 9 | " | 10 | 3400 | 3.0 | $1.8 \times 10^{10}$ |
| 10 | " | 120 | 3500 | 3.2 | $1.6 \times 10^{10}$ |
| 11* | " | " | 11200 | 8.7 | $3.6 \times 10^7$ |
| 12 | " | 10 | 4800 | 2.0 | $2.8 \times 10^{10}$ |
| 13 | " | 120 | 5500 | 2.1 | $2.7 \times 10^{10}$ |
| 14* | " | 120 | 13500 | 8.2 | $3.7 \times 10^7$ |
| 15 | " | 10 | 9200 | 1.1 | $1.5 \times 10^{11}$ |
| 16 | " | 120 | 11000 | 1.2 | $1.0 \times 10^{11}$ |
| 17* | " | " | 13400 | 8.0 | $3.8 \times 10^7$ |
| 18* | " | " | 13200 | 8.0 | $3.7 \times 10^7$ |
| 19 | " | " | 11800 | 5.0 | $8.0 \times 10^9$ |
| 20 | " | 10 | 9500 | 1.8 | $4.2 \times 10^{10}$ |
| 21 | " | 120 | 11200 | 2.2 | $2.6 \times 10^{10}$ |
| 22 | " | " | 9300 | 1.2 | $1.0 \times 10^{11}$ |
| 23 | " | " | 7100 | 1.6 | $8.5 \times 10^{10}$ |
| 24 | " | " | 2900 | 2.2 | $2.7 \times 10^{10}$ |
| 25* | " | " | 1800 | 3.8 | $1.5 \times 10^{10}$ |
| 26* | " | " | 11600 | 6.4 | $8.0 \times 10^7$ |
| 27 | " | 10 | 7900 | 1.7 | $4.9 \times 10^{10}$ |
| 28 | " | 120 | 9500 | 2.1 | $2.8 \times 10^{10}$ |
| 29* | " | " | 6100 | 5.3 | $6.0 \times 10^8$ |
| 30 | " | 10 | 2500 | 1.8 | $4.1 \times 10^{10}$ |
| 31 | " | 120 | 4000 | 2.0 | $3.0 \times 10^{10}$ |
| 32 | " | 10 | 1800 | 1.0 | $1.6 \times 10^{11}$ |
| 33 | " | 120 | 2500 | 1.1 | $1.4 \times 10^{11}$ |
| 34 | " | " | 1700 | 1.9 | $3.0 \times 10^{10}$ |
| 35 | 1000 | " | 2200 | 2.2 | $2.8 \times 10^{10}$ |
| 36 | " | " | 2000 | 2.1 | $2.7 \times 10^{10}$ |
| 37* | " | " | 1500 | 1.9 | $3.0 \times 10^{10}$ |

Note: compositions with asterisk (*) are outside the scope of the present invention.

Table 1 shows the results of measurement of relative dielectric constant, dissipation factor and specific resistance, each at 25° C., of sintered product. The following facts (1) to (4) are obvious from the results.

(1) The present low temperature-sinterable dielectric composition represented by the general formula:

$$A \cdot Pb(Fe_{\frac{2}{3}}W_{\frac{1}{3}})_{1-x}Ti_xO_3 + B \cdot MnO_2$$

wherein $0.005 \leq X \leq 0.65$, $A = 0.95$–$0.9995$, and $B = 0.0005$–$0.05$, can have a relative dielectric constant of at least 2,000 at 25° C., a dissipation factor of not higher than 5% at 25° C., and a specific resistance of at least $10^9$ $\Omega \cdot$cm at 25° C., even when fired at a temperature of not higher than 1,000° C.

(2) The present dielectric composition in which $0.005 \leq X \leq 0.40$, $A = 0.95$–$0.9995$ and $B = 0.0005$–$0.05$ in said general formula can have a relative dielectric constant of at least 2,000 at 25° C., a dissipation factor of not higher than 5% at 25° C., and a specific resistance of at least $10^9$ $\Omega \cdot$cm at 25° C., even when fired at a temperature of not higher than 900° C. (for example, at 900° for two hours).

(3) The present dielectric composition, in which $0.005 \leq x \leq 0.35$, $A=0.95-0.9995$ and $B=0.0005-0.05$ in said general formula, can have a relative dielectric constant of at least 2,000 at 25° C., a dissipation factor of not higher than 5% at 25° C., and a specific resistance of at least $10^9$ Ω.cm at 25° C., even when fired at 900° C. for 10 minutes.

(4) The present dielectric composition, in which $0.005 \leq x \leq 0.30$, $A=0.95-0.9995$, and $B=0.0005-0.05$ in said general formula, can have a relative dielectric constant of 3,400-9,500 at 25° C., a dissipation factor of not higher than 5% at 25° C., and a specific resistance of at least $10^9$ Ω.cm at 25° C., even when fired at 900° C. for 10 minutes.

EXAMPLE 2

Figure 2:
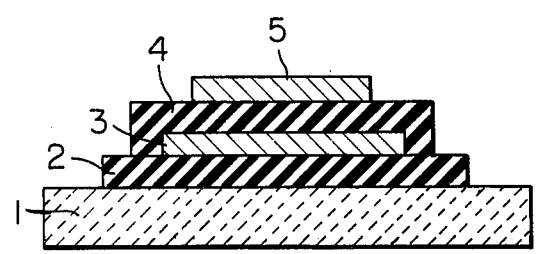

Lead oxide, ferric oxide, tungsten oxide, titanium oxide, and manganese dioxide were weighed out in the proportions shown in Table 1, NOS. 3, 6, 9, 12, 15, 20, 27 and 30, and prepared into calcined powder in the same manner as in Example 1. The resulting power had the maximum particle size of 20 μm. 30 g of the powder was admixed with 5 ml of an ethylcellulose solution in α- terpineol, uniformly kneaded into a dielectric paste by a three-roll kneader. Then, the dielectric paste was three times printed on alumina substrate plate 1 and dried to give insulation layer 2, as shown in FIG. 1 and FIG. 2. An electrode paste containing silver as a main component was printed on the insulation layer, and dried to give lower electrode 3. Furthermore, the dielectric paste was twice printed on the lower electrode, and dried to give dielectric layer 4. The electrode paste containing silver as a main component was printed on the dielectric layer, and dried to give upper electrode 5. Then, the resulting plate was fired in a belt oven at 900° C. for 10 minutes to obtain a thick film capacitor. The resulting thick film capacitor had the insulation layer, 70-100 μm thick and the dielectric layer, 40-50 μm thick.

Relative dielectric constant and dissipation factor (tan δ) of the thick film capacitor were measured in the same manner as in Example 1, and the results are given in Table 2. It is obvious from Table 2 that the thick film capacitors prepared from the present low temperature-sinterable dielectric compositions had a relative dielectric constant of at least 2,000 at 25° C., a dissipation factor of not higher than 5% at 25° C., and a specific resistance of at least $7 \times 10^9$ Ω.cm.

A thick film capacitor without the insulation layer of FIG. 1 and FIG. 2 has characteristics inferior to those shown in Table 2, but the characteristics are practically applicable.

The present low temperature-sinterable dielectric composition can be also applied to a lamination type capacitor.

state, lead titanate, and manganese dioxide, characterized in that its sintered composition, prepared by firing the composition at a temperature of 900° C. for 10 minutes, is represented by the general formula $$A.Pb(Fe_{\frac{2}{3}}W_{\frac{1}{3}})_{1-x}Ti_xO_3 + B.MnO_2$$

wherein $0.005 \leq x \leq 0.35$, $A=0.95-0.9995$, and $B=0.0005-0.05$, and has a relative dielectric constant of at least 2,000 at 25° C., a dissipation factor (tan δ) of not higher than 5% at 25° C., and a specific resistance of at least $10^9$ Ω.cm at 25° C.

2. A low temperature-sinterable dielectric composition of uniform mixture consisting of lead ferrotungstate, lead titanate, and manganese dioxide, characterized in that its sintered composition, prepared by firing the composition at 900° C. for 10 minutes, is represented by the general formula $$A.Pb(Fe_{\frac{2}{3}}W_{\frac{1}{3}})_{1-x}Ti_xO_3 + B.MnO_2$$

wherein $0.005 \leq x \leq 0.30$, $A=0.95-0.9995$ and $B=0.0005-0.05$, and has a relative dielectric constant of 3,400-9,500 at 25° C., a dissipation factor (tan δ) of not higher than 5%, at 25° C. and a specific resistance of at least $10^9$ Ω.cm at 25° C.

3. A thick film capacitor comprising a substrate plate, a lower electrode formed on the substrate plate, a dielectric layer formed on the lower electrode, and an upper electrode formed on the dielectric layer, characterized in that the dielectric layer is prepared from a low temperature-sinterable dielectric composition consisting of lead ferrotungstate, lead titanate and manganese dioxide, represented by the general formula $$A.Pb(Fe_{\frac{2}{3}}W_{\frac{1}{3}})_{1-x}Ti_xO_3 + B.MnO_2$$

wherein $0.005 \leq x \leq 0.35$, $A=0.95-0.9995$ and $B=0.0005-0.05$.

4. A thick film capacitor comprising a substrate plate, a lower electrode formed on the substrate plate, a dielectric layer formed on the lower electrode, and an upper electrode formed on the dielectric layer, characterized in that the dielectric layer is prepared from a low temperature-sinterable dielectric composition consisting of lead ferrotungstate, lead titanate and manganese dioxide, represented by the general formula $$A.Pb(Fe_{\frac{2}{3}}W_{\frac{1}{3}})_{1-x}Ti_xO_3 + B.MnO_2$$

wherein $0.05 \leq x \leq 0.30$, $A=0.95-0.9995$ and $B=0.0005-0.05$.

5. The thick film capacitor according to claim 3 or 4, wherein said low temperature-sinterable dielectric composition is sintered at 900° C. for 10 minutes to provide a sintered composition.

TABLE 2

| No. | Composition $Pb(Fe_{\frac{2}{3}}W_{\frac{1}{3}})_{1-x}Ti_xO_3$ | MnO$_2$ content (Mol. %) | Relative dielectric constant at 25° C. (ε) | Dissipation factor at 25° C. (%) | Specific resistance at 25° C. (Ω . cm) |
|---|---|---|---|---|---|
| 1 | x = 0.005 | 3.0 | 2000 | 4.8 | $7.1 \times 10^9$ |
| 2 | x = 0.01 | 3.0 | 2100 | 4.6 | $9.2 \times 10^9$ |
| 3 | x = 0.05 | 1.5 | 2600 | 3.3 | $1.6 \times 10^{10}$ |
| 4 | x = 0.10 | 0.6 | 4200 | 2.7 | $2.1 \times 10^{10}$ |
| 5 | x = 0.20 | 0.3 | 8400 | 1.8 | $4.0 \times 10^{10}$ |
| 6 | x = 0.25 | 0.2 | 8500 | 2.3 | $2.5 \times 10^{10}$ |
| 7 | x = 0.30 | 0.2 | 6900 | 2.2 | $2.7 \times 10^{10}$ |
| 8 | x = 0.35 | 0.1 | 2100 | 2.1 | $3.0 \times 10^{10}$ |

What is claimed is:

1. A low temperature-sinterable dielectric composition of uniform mixture consisting of lead ferrotungstate,

* * * * *